United States Patent
Wong et al.

(10) Patent No.: US 7,020,503 B2
(45) Date of Patent: Mar. 28, 2006

(54) METHOD AND SYSTEM FOR DETERMINING MECHANICAL STRAIN IN A MOBILE PHONE

(75) Inventors: John P Wong, Vancouver (CA); Dean Parfeniuk, Anmore (CA)

(73) Assignee: Nokia Corporation, Espoo (FI)

( * ) Notice: Subject to any disclaimer, the term of this patent is extended or adjusted under 35 U.S.C. 154(b) by 558 days.

(21) Appl. No.: 10/109,471

(22) Filed: Mar. 27, 2002

(65) Prior Publication Data

US 2004/0203500 A1    Oct. 14, 2004

(51) Int. Cl.
*H04B 1/38*        (2006.01)
(52) U.S. Cl. .................. 455/575.1; 455/90.3
(58) Field of Classification Search ............. 455/550.1, 455/575.1, 575.8, 90.3, 404.1, 347; 340/573.1, 340/573.4
See application file for complete search history.

(56) References Cited

U.S. PATENT DOCUMENTS

| | | | |
|---|---|---|---|
| 4,767,484 A * | 8/1988 | Schott et al. ............ 455/404.1 |
| 4,777,477 A * | 10/1988 | Watson ..................... 340/573.4 |
| 5,392,027 A * | 2/1995 | Brunot et al. ................ 340/561 |
| 5,452,699 A * | 9/1995 | Rossignol .................... 123/481 |
| 5,497,149 A * | 3/1996 | Fast ........................... 340/988 |
| 5,652,570 A * | 7/1997 | Lepkofker ............... 340/573.4 |
| 5,731,757 A * | 3/1998 | Layson, Jr. ............... 340/573.1 |
| 6,362,778 B1 * | 3/2002 | Neher ................... 342/357.07 |
| 6,636,732 B1 * | 10/2003 | Boling et al. ............ 455/404.1 |
| 6,725,717 B1 * | 4/2004 | Hiebert .................... 73/204.26 |
| 6,774,797 B1 * | 8/2004 | Freathy et al. ........... 340/573.1 |
| 2002/0145731 A1 * | 10/2002 | Kritler et al. ............... 356/73.1 |
| 2004/0183648 A1 * | 9/2004 | Weber et al. ................. 338/47 |

\* cited by examiner

*Primary Examiner*—Nick Corsaro
*Assistant Examiner*—Raymond B. Persino
(74) *Attorney, Agent, or Firm*—Harrington & Smith, LLP

(57) ABSTRACT

A method and system for determining mobile phone strain is provided. The method includes the steps of determining if strain on a mobile phone housing and/or strain on a printed circuit board (PCB) within the mobile phone exceed a predetermined value. If the strain(s) values exceed the predetermined value an alarm may be sounded and the strain values may be stored in memory for later retrieval and/or analysis.

37 Claims, 4 Drawing Sheets

METHOD AND SYSTEM FOR DETERMINING MECHANICAL STRAIN IN A MOBILE PHONE

BACKGROUND OF THE INVENTION

1. Field of the Invention

The present invention relates generally to radio telephones and radio telephone systems and, in particular, but not limited to, radio telephones, and mobile radio communication systems and networks.

2. Prior Art

Modern mobile phones are often placed in situations where they are subjected to a variety of forces that may bend, twist, or otherwise distort the mobile phone case, and/or its internal circuitry systems past a failure point. Such situations may arise from a user sitting on the mobile phone, a mobile phone being crammed into an already over filled briefcase or satchel, or the mobile phone being dropped. Distorting the mobile phone may result in cracked housings and/or internal circuitry that is rendered inoperable. In many cases it may be difficult for a manufacturer to readily determine if an inoperable circuit board is defective due to manufacturing defects or due to user misuse. Therefore, it is desirable to provide a method and system for a mobile phone that overcomes the disadvantages noted above.

SUMMARY OF THE INVENTION

In accordance with one embodiment of the present invention a strain indicator system for indicating mechanical strain in a communications device is provided.

The strain indicator system includes a mobile phone housing strain indicator that is mechanically coupled to the housing and an electric circuit coupled to the housing strain indicator for determining housing strain. In addition, at least one strain alarm device is coupled to the electric circuit for sounding an alarm if the electric circuit determines housing strain exceeds a predetermined value.

In accordance with another embodiment of the present invention a strain sensing system for sensing strain within a mobile phone is provided. The strain system includes a housing strain indicator mechanically coupled to the mobile phone housing; and a printed circuit board (PCB) strain indicator. The PCB strain indicator is mechanically coupled to a PCB adapted to fit within the mobile phone.

The invention is also directed towards a method for determining mobile phone strain. The method includes the steps of determining mobile phone housing strain and sounding an alarm if mobile phone housing strain exceeds a predetermined value. The method also includes steps for determining and sounding an appropriate alarm if strain on a printed circuit board (PCB) within the mobile phone exceeds, or is about to exceed, a predetermined threshold value. The method also includes steps for storing strain values for later retrieval and analysis.

In accordance with another embodiment of the present invention a strain indicator system for indicating mechanical strain in a printed circuit board (PCB) is provided. The strain indicator system includes at least one PCB strain indicator coupled to the PCB and at least one electric circuit coupled to PCB strain indicator(s). Coupled to the electric circuit is at least one alarm device, such as a light and/or a speaker for indicating when PCB strain is about to exceed, or has exceeded, a predetermined threshold.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
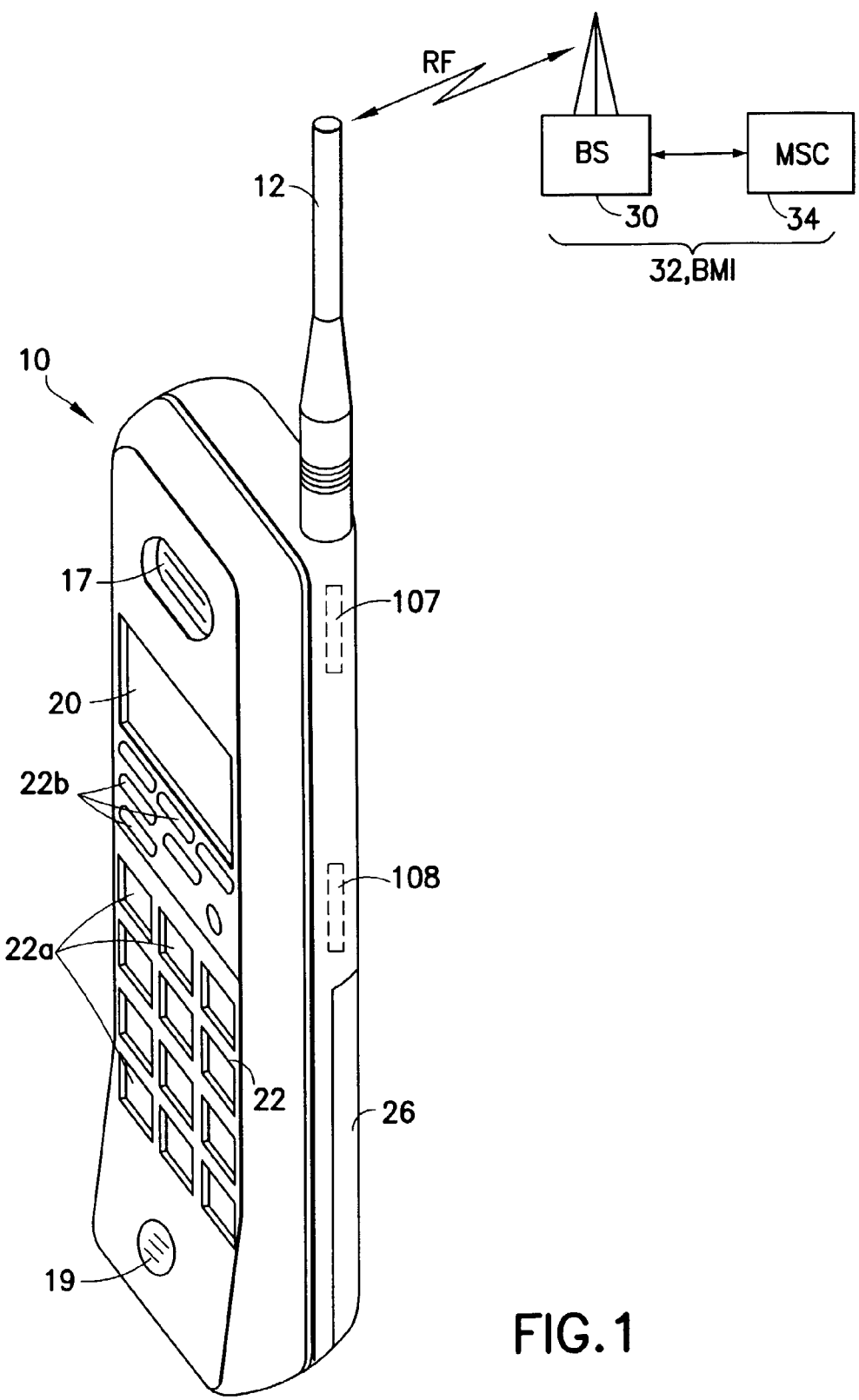
FIG. 1 is a perspective view of a mobile station incorporating features of the present invention.

Although the present invention will be described with reference to the embodiments shown in the drawings, it should be understood that the present invention could be embodied in many alternate forms of embodiments.

Figure 2:
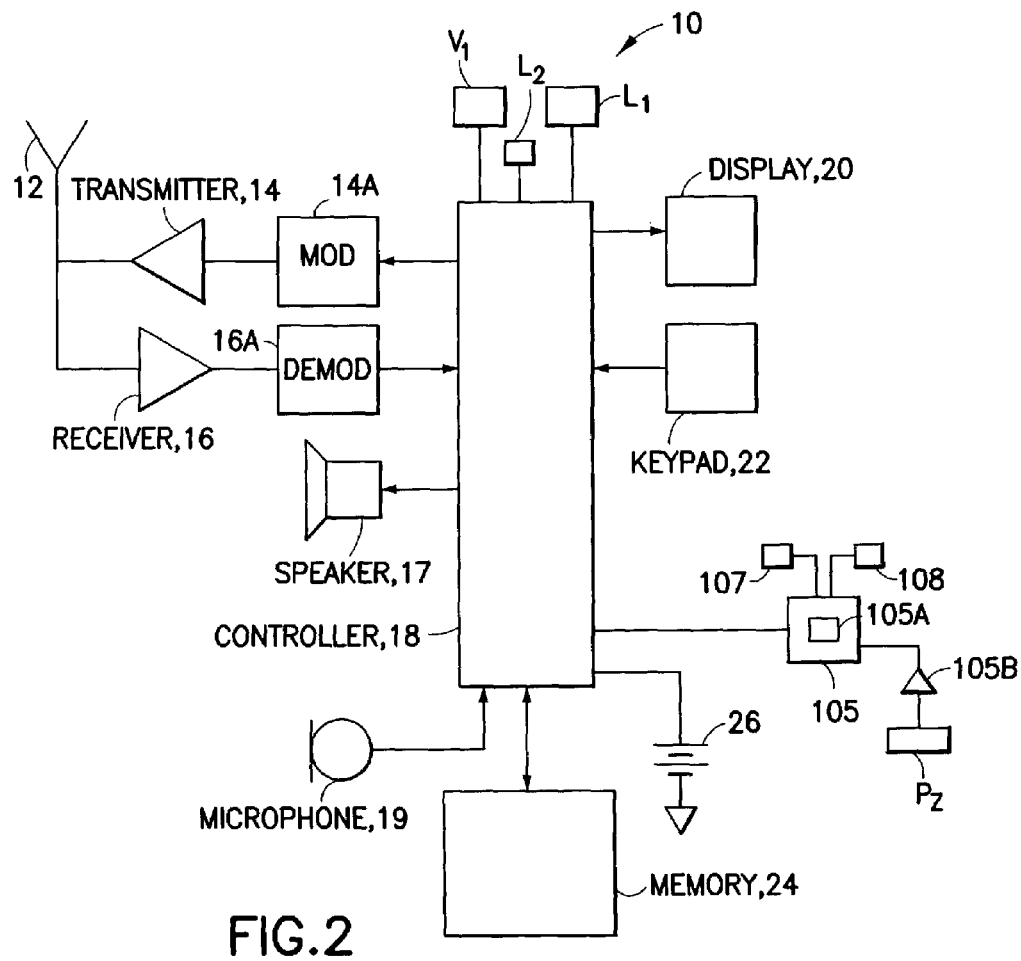
FIG. 2 is a block diagram of the mobile station shown in FIG. 1 that is constructed and operated in accordance with one embodiment of this invention.

FIGS. 1 and 2 are shown for illustrating a wireless user terminal or mobile station (MS) 10, such as but not limited to a radiotelephone or a personal communicator, which is suitable for practicing this invention.

Referring to FIG. 1, the MS 10 includes an antenna 12 for receiving signals from a base site or base station 30, which is assumed to include a base station sub-system (BSS) as well as a base transceiver station (BTS). For simplicity, these two components are collectively referred to simply as the base station 30.

A user interface of the MS 10 connectable to a communications network may include a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station. In addition, the various circuits may be contained within one or more printed circuit boards (PCBs). The MS 10 also includes various memories, shown collectively as the memory 24, wherein are stored a plurality of constants and variables that are used by the controller 18 during the operation of the MS.

The MS 10 also includes a modulator (MOD) 14A, a transmitter 14, a receiver 16, a demodulator (DEMOD) 16A, and a controller 18 that provides signals to and receives signals from the transmitter 14 and receiver 16, respectively.

Still referring to FIG. 1, one embodiment of the present invention the mobile station housing 10A may include a body strain indicator 107. The strain indicator 107 may be any suitable strain indicator such as a pattern of resistive foil mounted on a backing material and epoxy bonded (or mechanically coupled) to the mobile station housing 10A, or a piezo-electric crystal epoxy bonded (or mechanically coupled) to the mobile station housing 10A. The piezo-electric crystal may be any suitable shape such, as rectangular or circular, and mounted to the housing to maximize strain detection along a sensitive axis of the piezo-electric crystal.

Figure 5:
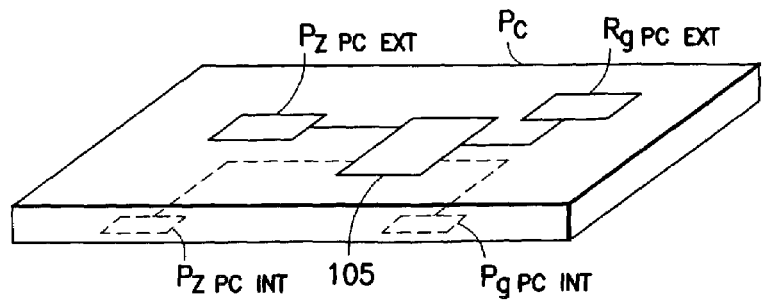
FIG. 5 is a pictorial diagram of a printed circuit board incorporating features of the present invention.

In alternate embodiments, the strain indicator may be fabricated within the body of the mobile phone housing during the manufacture process (see FIG. 5). For example, thin film strain gauge layering techniques may be used in metal housings such as titanium. In addition, more than one strain indicator 107 may be strategically mounted within the mobile station housing 10A. The principles of resistive strain gauge sensors and piezo-electric crystals are well known and need not be discussed here.

Figure 3:
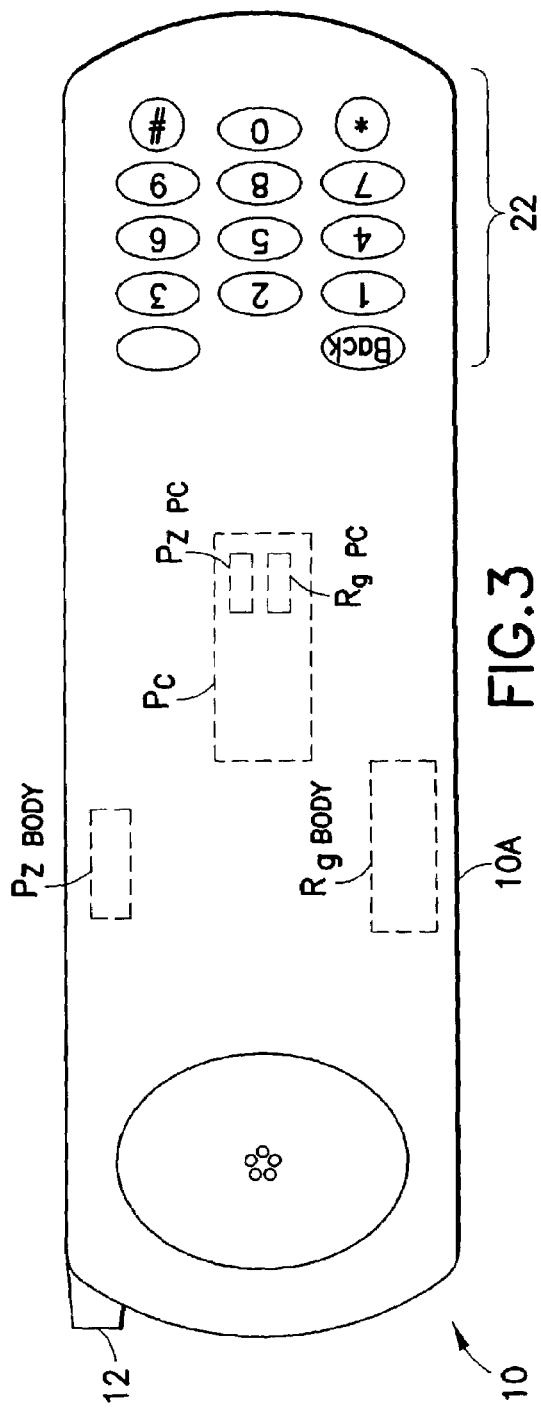
FIG. 3 is a perspective view of an alternate embodiment of a mobile station incorporating features of the present invention.

In alternate embodiments, the PCB may have a PCB strain gauge 108 mechanically coupled or epoxy bonded to the PCB. In alternate embodiments, more than one PCB may have one or more strain gauges mechanically attached (see FIG. 3).

Figure 6A:
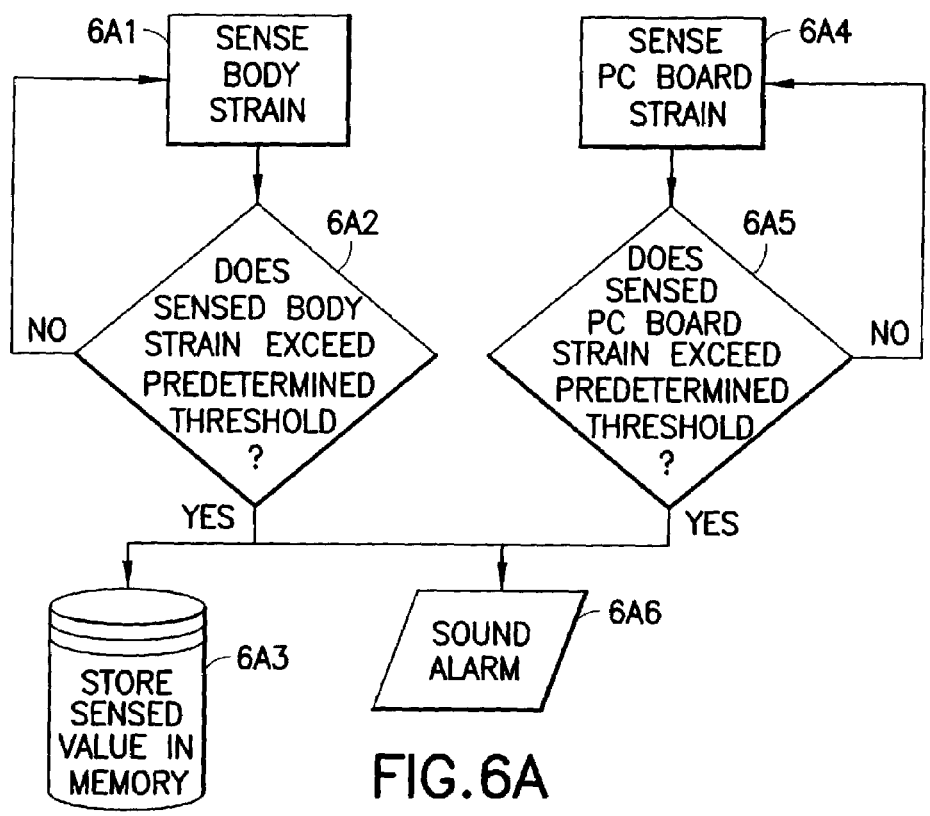
FIGS. 6A and 6B are flow diagrams showing alternate method steps for implementing features of the present invention shown in FIG. 1.

The method steps for determining body strain and PCB strain are shown in FIG. 6A. Steps 6A1 and 6A4 measure body strain and PCB strain, respectively. Step 6A6 sounds an alarm and step 6A3 stores the sensed value(s) in memory if either step 6A2 or step 6A5 determines that the strains exceed a predetermined threshold.

Referring also to FIG. 2, the MS also includes circuitry 105 for receiving a signal from the strain gauge indicator(s) 107,108. Also shown in FIG. 2 are exemplary alarm indicators such as light circuits $L_1, L_2$ and vibration unit V, used together or separately, to alert a user when a predetermined strain is about to be exceeded or when strain has exceeded a predetermined threshold. Similarly, the display 20 could also be used to alert the user when a predetermined strain is about to be exceeded or when strain has exceeded a predetermined threshold.

Figure 4:
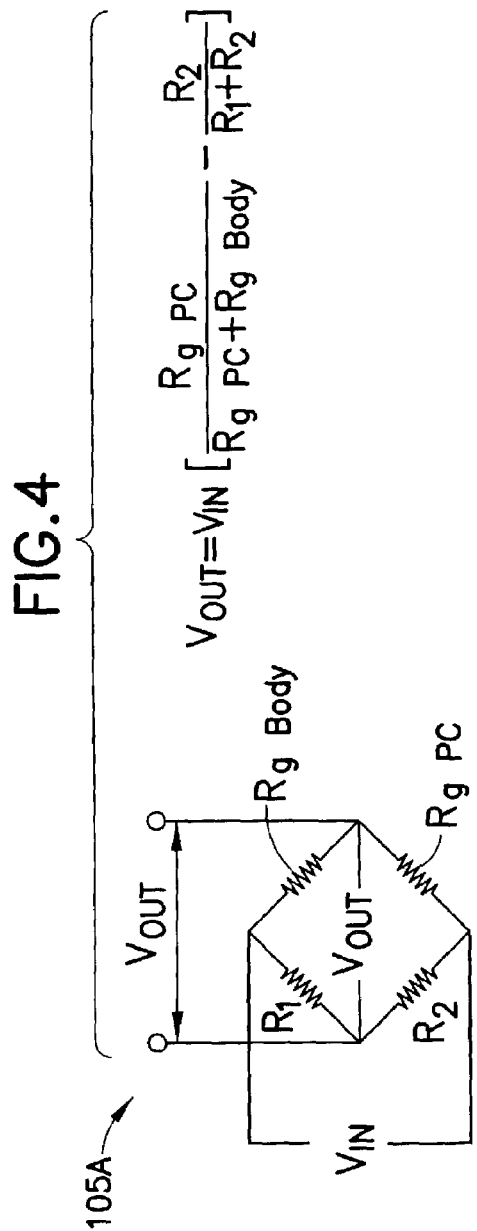
FIG. 4 is a schematic diagram of one component of the embodiment of the present invention shown in FIG. 2.

Referring to FIG. 4, in one embodiment, circuitry 105 may include an electric circuit 105A that is capable of measuring small changes in resistance corresponding to strain placed upon the mobile phone housing, such as, for example, a Wheatstone bridge. The strain gauge circuit shown in FIG. 4 shows one body strain gauge 107 and one PCB strain gauge in the electric circuit 105A. Resistors $R_1$ and $R_2$ may be any suitable resistor. Wheatstone bridges are well known and need not be discussed here. The output voltage of the Wheatstone bridge is generally expressed in millivolts output per volt input (i.e., high sensitivity). Alternate embodiments may use any suitable type of electric circuit, such as a Chevron bridge, or a four wire ohm circuit. In embodiments using a piezo-electric crystal (FIG. 2, item Pz), a less sensitive buffer amplifier circuit (FIG. 2, item 105B) may be used.

In embodiments using a circuit 105A, such as the Wheatstone bridge, and resistive strain gauge(s) (FIG. 3, items $R_{gpc}$ and/or $Rg_{body}$), the amount of stress placed on the mobile phone housing may be determined to within a very small resolution. The output of the electric circuit 105 may be used to drive the speaker (FIG. 2, item 17) with a predefined alarm tone or sound pattern when the mobile phone housing (FIG. 1, item 10A) is experiencing strain. In addition the output of the electric circuit 105A may be digitally stored in memory (FIG. 2, item 24) for later retrieval and analysis.

It will be appreciated that the low level of the strain signal makes it particularly subject to unwanted interference from other electrical components or external devices. For example, transmitting components within the mobile phone are potential error sources in the strain measurement circuit. Another error source may include magnetically induced voltages. The sum of such interferences can result in degradation of the strain measurement and therefore suitable shielding is preferably used, at least around the strain transducer and bridge circuits.

The electric circuit 105A may be adjusted to only sound an alarm when mobile phone housing strain exceeds a certain manufacture determined threshold strain value the threshold value or values are preferably stored in the memory 24.

Referring to FIG. 5 there is shown an alternate embodiment of the present invention incorporating strain sensing features within, or on, a printed circuit PCB. In this embodiment, the aforementioned strain indicators may be bonded to (i.e., external) or within (i.e., internal) the PCB. Similar to the above description, the external and/or internal strain indicators $P_{zpc}$ and $R_{gpc}$ may be used to indicate when, and how much strain a PCB is experiencing. It will be appreciated, that in certain embodiments the sensors may be arranged in individual sensing circuits or grouped together in a sensing circuit, similar to FIG. 4. When the PCB strain exceeds a predetermined value (i.e., a manufacturer-specified value) an alarm may be sounded though the mobile phone speaker as well as storing the value in memory 24 for later retrieval and analysis.

The PCB strain indicators $P_{zpc}$ and $R_{gpc}$ may be bonded to the PCB or embedded within the PCB during PCB manufacture as illustrated in FIG. 5. For example, sputter deposited thin-metal-film gauges could be deposited within the (multi-layer) circuit board. This would have the advantage of a bonded strain indicator but without the disadvantage of strain coupling loss through the bonding material.

In alternate embodiments the electric circuit 105 (or circuits) may signal a warning tone proportionate to the sensed strain and another, more urgent tone, when the PCB strain is about to be exceeded. The same technique can be used for the housing strain sensor(s). In addition, retrieval and comparison of strain values can be used to differentiate misuse or manufacturing defects.

Figure 6B:
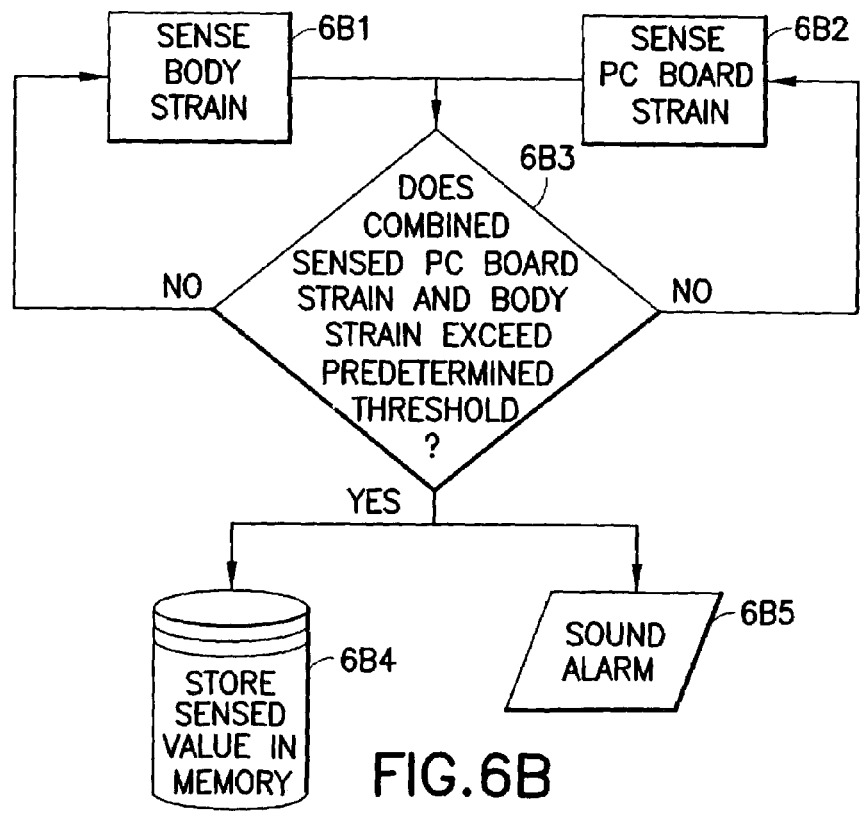

Also, in alternate embodiments where resistive strain gauges are used for both the mobile phone housing 10A strain indicator 107 and the PCB strain indicator 108, the resistive strain gauges may be combined in one Wheatstone bridge configuration as shown in FIG. 4. It will be appreciated that such a configuration effectively combines housing strain and PCB strain as sensed by the housing strain indicator and the PCB strain indicator, respectively; which then may then be compared to a predetermined aggregate value. The method steps for determining combined body strain and PCB strain are shown in FIG. 6B. Steps 6B1 and 6B2 measure body strain and PCB strain, respectively. Step 6B5 sounds an alarm and step 6B4 stores the sensed value(s) in memory if step 6B3 determines that the aggregate strains exceed a predetermined threshold.

It should be understood that the foregoing description is only illustrative of the invention. Various alternatives and modifications may be devised by those skilled in the art without departing from the invention. For example, in alternate embodiments, the experienced strain value, or values, may be uploaded over a control link to the BS for analysis and/or historical information regarding mobile phone strain. Alternatively, in alternate embodiments, the strain experienced by either the mobile phone housing or the mobile phone PCB may be stored in memory 24 along with a time stamp for later strain analysis. This information may be used optimize manufacturing designs and/or techniques.

What is claimed is:

1. A strain indicator system for indicating mechanical strain in a communications device having a housing, the strain indicator system comprising:

at least one housing strain indicator, wherein the at least one housing strain indicator is mechanically coupled to the housing;

at least one first electric circuit coupled to the at least one housing strain indicator for determining housing strain;

at least one first alarm device coupled to the at least one first electric circuit, wherein the strain indicator system is adapted to automatically emanate a human perceivable sensory signal from the communications device when the housing is subjected to an unintentional strain beyond a predetermined undesired strain threshold.

2. A strain indicator system as in claim 1 wherein the at least one first electric circuit comprises a first buffer-amplifier circuit.

3. A strain indicator system as in claim 1 wherein the at least one first alarm device comprises a first light adapted to signal housing strain exceeding a predetermined value.

4. A strain indicator system as in claim 1 wherein the at least one first alarm device comprises a first sound alarm adapted to signal housing strain exceeding a predetermined value.

5. A strain indicator system as in claim 1 wherein the at least one first alarm device comprises a vibrator for vibrating the housing.

6. A strain indicator system as in claim 1 wherein the at least one housing strain indicator mechanically coupled to the housing comprises the at least one housing strain indicator epoxy bonded to the housing.

7. A strain indicator system as in claim 1 wherein the at least one housing cell strain indicator mechanically coupled to the housing comprises the at least one housing strain indicator fabricated within the housing.

8. A strain indicator system as in claim 1 further comprising a memory for storing the housing strain determined by the first electric circuit.

9. A strain indicator system as in claim 1 further comprising:
at least one printed circuit board (PCB);
at least one PCB strain indicator, the at least one PCB strain indicator mechanically coupled to the PCB;
at least one second electric circuit coupled to the at least one PCB strain indicator for determining PCB strain, wherein the at least one second electric circuit is coupled to the at least one first alarm device.

10. A strain indicator system as in claim 1 wherein the at least one housing strain indicator comprises at least one first resistive strain gauge.

11. A strain indicator system as in claim 10 wherein the at least one first resistive strain gauge comprises at least one element of a first Wheatstone bridge.

12. A strain indicator system as in claim 1 wherein the at least one housing cell strain indicator comprises at least one first piezo-electric crystal.

13. A strain indicator system as in claim 12 wherein the at least one first piezo-electric crystal comprises at least one first rectangular shaped piezo-electric crystal.

14. A strain indicator system as in claim 12 wherein the at least one first piezo-electric crystal comprises at least one first circular shaped piezo-electric crystal.

15. A strain indicator system for indicating mechanical strain in a communications device having a housing, the strain indicator system comprising:
at least one housing strain indicator, wherein the at least one housing strain indicator is mechanically coupled to the housing;
at least one first electric circuit coupled to the at least one housing strain indicator for determining housing strain;
at least one first alarm device coupled to the at least one first electric circuit;
at least one printed circuit board (PCB);
at least one PCB strain indicator, the at least one PCB strain indicator mechanically coupled to the PCB;
at least one second electric circuit coupled to the at least one PCB strain indicator for determining PCB strain;
at least one second alarm device coupled to the at least one second electric circuit.

16. A strain indicator system as in claim 15 wherein the at least one second electric circuit comprises a second buffer-amplifier circuit.

17. A strain indicator system as in claim 15 wherein the at least one second alarm device comprises a second light adapted to signal PCB strain exceeding a predetermined value.

18. A strain indicator system as in claim 15 wherein the at least one second alarm device comprises a sound alarm adapted to signal PCB strain exceeding a predetermined value.

19. A strain indicator system as in claim 15 wherein the at least one second alarm device comprises a first vibrator for vibrating the housing.

20. A strain indicator system as in claim 15 wherein the at least one PCB strain indicator mechanically coupled to the PCB comprises the at least one PCB strain indicator epoxy bonded to the PCB.

21. A strain indicator system as in claim 15 wherein the at least one PCB strain indicator mechanically coupled to the housing comprises the at least one PCB strain indicator fabricated within the PCB.

22. A strain indicator system as in claim 15 further comprising a memory for storing the housing strain determined by the second electric circuit.

23. A strain indicator system as in claim 15 wherein the at least one PCB strain indicator comprises at least one second resistive strain gauge.

24. A strain indicator system as in claim 23 wherein the at least one second resistive strain gauge comprises at least one element of a second Wheatstone bridge.

25. A strain indicator system as in claim 15 wherein the at least one PCB strain indicator comprises at least one second piezo-electric crystal.

26. A strain indicator system as in claim 25 wherein the at least one second piezo-electric crystal comprises at least one second rectangular shaped piezo-electric crystal.

27. A strain indicator system as in claim 25 wherein the at least one second piezo-electric crystal comprises at least one second circular shaped piezo-electric crystal.

28. A strain sensing system for sensing strain within a mobile phone, the strain system comprising:
at least one housing strain indicator, the housing strain indicator mechanically coupled to a mobile phone housing, wherein the at least one housing strain indicator is adapted to sense strain of the housing; and
at least one printed circuit board (PCB) strain indicator, wherein the PCB strain indicator is mechanically coupled to at least one PCB, wherein the PCB strain indicator is adapted to sense strain of the PCB, and wherein the at least one PCB is adapted to fit within the mobile phone housing.

29. A strain sensing system as in claim 28 wherein the at least one housing strain indicator comprises at least one first resistive strain gauge.

30. A strain sensing system as in claim 28 wherein the at least one housing strain indicator comprises at least one first piezo-electric crystal.

31. A strain sensing system as in claim 28 wherein the at least one PCB strain indicator comprises at least one second resistive strain gauge.

32. A strain sensing system as in claim 28 wherein the at least one PCB strain indicator comprises at least one second piezo-electric crystal.

33. A strain sensing system as in claim 28 further comprising a first strain circuit configuration, wherein the first strain configuration comprises:
   at least one of the at least one housing strain indicator; and
   at least one of the at least one PCB strain indicator.

34. A strain sensing system as in claim 33 wherein the first strain circuit configuration comprises a Wheatetone bridge circuit configuration.

35. A method for determining mobile phone strain, the method comprising the steps of:
   determining at least one unintentional phone housing strain; and
   sounding an alarm if the at least one unintentional phone housing strain exceeds a predetermined undesired strain value.

36. A method as in claim 35, wherein the step of determining mobile phone strain further comprises the steps of:
   determining at least one printed circuit board (PCB) strain; and
   sounding an alarm if the at least one PCB strain exceeds a PCB predetermined undesired strain value.

37. A method as in claim 36 wherein the step of sounding the alarm comprises sounding a tone proportionate relative to a sensed strain.

* * * * *

UNITED STATES PATENT AND TRADEMARK OFFICE
CERTIFICATE OF CORRECTION

| | | |
|---|---|---|
| PATENT NO. | : 7,020,503 B2 | Page 1 of 1 |
| APPLICATION NO. | : 10/109471 | |
| DATED | : March 28, 2006 | |
| INVENTOR(S) | : John P. Wong et al. | |

It is certified that error appears in the above-identified patent and that said Letters Patent is hereby corrected as shown below:

IN THE CLAIMS:

Claim 34, Column 7, line 13, please delete "Wheateton" and replace with --Wheatstone--.

Claim 35, Column 8, line 1, after "unintentional" insert --mobile--.

Claim 35, Column 8, line 3, after "unintentional" insert --mobile--.

Signed and Sealed this

Second Day of January, 2007

JON W. DUDAS
*Director of the United States Patent and Trademark Office*